July 15, 1969   R. KORPMAN   3,455,859
AGGLUTINANT
Filed May 9, 1966
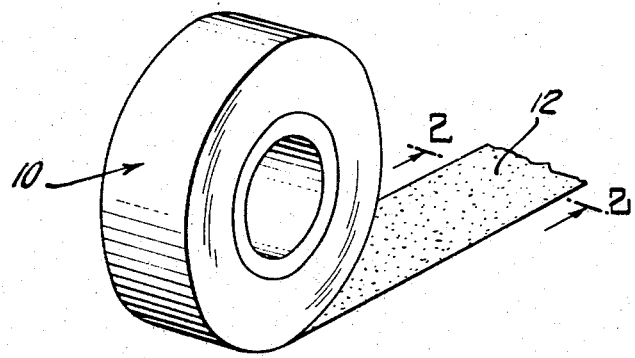
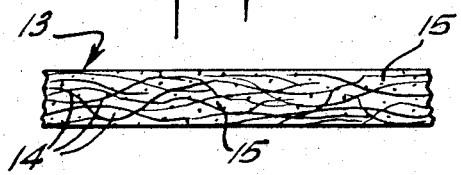
INVENTOR
RALF KORPMAN
BY
*Charles A. Harris*
ATTORNEY United States Patent Office 3,455,859
Patented July 15, 1969

3,455,859
AGGLUTINANT
Ralf Korpman, East Brunswick, N.J., assignor to Johnson
 & Johnson, a corporation of New Jersey
Filed May 9, 1966, Ser. No. 548,672
Int. Cl. C09j 3/16; C08g 37/32, 37/20
U.S. Cl. 260—25                                15 Claims

ABSTRACT OF THE DISCLOSURE

A fast curing agglutinant composition which comprises a normally liquid synthetic diene polymer having a molecular weight of between about 500 and 4000 and a substantial molar amount of hydroxyl or carboxyl reactive groups, together with heat-curing constituents comprising about 20–150 parts by weight of polymers of oil soluble diene-polymer-reactive heat-curing aldehyde resin. The composition may also include an accelerator for the heat-curing resin. The agglutinant may be in the form of a pressure-sensitive or heat activatible adhesive or a bonding agent or impregnant for paper tape backings or the like. Various specific pressure-sensitive adhesive tapes also are disclosed.

---

The present invention relates to agglutinants of the type which are adapted to be used as adhesives for pressure-sensitive adhesive tapes and for heat-sensitive bonding tapes and other applications, bonding materials for unifying fibrous webs, and the like.

Heretofore, pressure-sensitive adhesives generally have been produced by mixing normally solid elastomeric materials with tackifiers to provide the desired degree of tackiness, or quick-stick, either with or without a curing agent to assure that the resulting adhesive possesses sufficient cohesiveness or internal strength. The elastomer is first broken down somewhat to a more plastic but still solid state by milling the elastomer or treating it in a Banbury mixer. It is also mixed with the tackifier and/or the curing agent, together with a solvent for the materials used. This type of pre-treatment and mixing is a relatively slow process and requires elaborate equipment. Solvents are used to assure proper mixing and provide the required coating viscosity, and the resulting adhesive composition normally is low in solids, ranging between about 10 and 40 percent solids by weight of the total mixture. Thus, the application of these adhesives to backing sheets and the like has been limited by the necessity for removing a fairly large amount of solvent from the adhesive composition subsequent to the coating step. This process is relatively expensive, not only because it is complicated and slow, but because of the relatively large amount of solvent which must be used. Solvents for this use are, themselves, relatively expensive and are almost completely wasted in the process since they must be removed from the adhesive before a useful product is attained.

Similar problems are encountered in preparing bonding materials for use in impregnating fibrous webs for unifying the webs or increasing their internal strength. In fact, even more time and expense is required to break down the elastomer for use in an impregnant. Thus, while there are many advantages to the use of solvent-based impregnants for this purpose, as compared with aqueous latices, and the like, many problems exist in connection with the mixing of the impregnant and the subsequent removal of the solvent from the impregnated fibrous web.

I have discovered that these problems can be overcome by basing the agglutinant on a low molecular weight synthetic diene polymer which is, itself, a liquid under normal conditions. Such a polymer must be cured to be suitable for use, but may be mixed directly and easily with the curing agent and/or tackifier, or other material, immediately prior to coating, and with little or no solvent. Normally some solvent is necessary to dissolve one or more of the curing components before dispersing them in the liquid of the diene polymer, itself. However, if all of the components of the agglutinant are liquid, they may be mixed directly without any added solvent.

The use of plastic viscid synthetic diene polymers already has been proposed for impregnation purposes. For instance, a system of this type for preparing high-temperature masking tapes is described in United States Letters Patent No. 2,725,981. This patent describes the impregnation of a bibulous kraft paper with a solvent-based impregnant comprising the aforesaid viscid polymer, a curing agent for the ploymer and other materials such as accelerators for the curing agent, or agents, used. Two basic types of curing agents are described, i.e., thiuram polysulfide vulcanizing agents, and phenol-aldehyde resin vulcanizing agents. The problems in using a sulfur-based curing agent of this type are well known. It is difficult to disperse these curing agents uniformly in the adhesive mixture and also difficult to get a uniform cure in the adhesive layer when the adhesive is cured in situ after application to a backing. Furthermore, sulfur cured adhesives tend to stain surfaces to which they are applied and generally posses unfavorable colors and emit unpleasant odors.

On the other hand, oil soluble diene-polymer-reactive heat-curing aldehyde resins are ideally suited for curing diene-polymer agglutinants for a variety of uses. These resins, not only are relatively easy to mix and provide uniform cures under the conditions of application, but also are free from the other disadvantages of the sulfur cures. In addition, such aldehyde cures are stable so that resin migration is kept to a minimum, and in pressure-sensitive adhesives actually promote tack so that the need for additional tackifying resins also is minimized.

Unfortunately, oil soluble diene-polymer-reactive heat-curring aldehyde resins do not cure agglutinants based on the normal synthetic low molecular weight liquid diene-polymers at a rate fast enough to be commercially practicable or economical for this purpose, even when various accelerators are used to accelerate the cure. As a result, it has not been possible to profit from the many advantages which would accrue from using low molecular weight, normally liquid, synthetic diene polymers as the basis for agglultinants intended for pressure-sensitive adhesive tapes, fiber bonding applications, and the like.

I now have invented a fast curing agglutinant composition which comprises a normally liquid synthetic diene polymer having a molecular weight of between about 500 and 4,000 and comprising a substantial molar percentage of hydroxyl or carboxyl reactive groups, and aldehyde heat curing constituents dispersed in the liquid of said polymer. The heat curing constituents comprise an oil soluble dienepolymer-reactive heat-curing aldehyde resin, and may include a compatible accelerator for said resin. This agglutinant, although based upon a low molecular weight liquid diene polymer, may be cured with an aldehyde resin system quite rapidly, i.e., within about four minutes at no more than about 350° F. thereby making its use commercially feasible for pressure-sensitive adhesive tapes, heat sensitive bonding adhesives, bonding materials for fibrous webs, and the like.

When the phrase "a substantial molar amount" is used herein in conjunction with the number of hydroxyl or carboxyl reactive groups per mol, it means an amount of said reactive groups are present in the polymer. When no carabout four minutes, at no more than about 350° F., and generally shall mean an amount in the range of magnitude of about one-half to two and one-half reactive groups per mol of the liquid polymer, said reactive groups preferably being in the terminal position. The amount referred to is determined on the basis of the total number of hydroxyl and carboxyl groups per mol in cases where both types of reactive groups are present in the polymer. When the carboxyl reactive groups are present, the preferred molar amount is about two to two and one-half hydroxyl groups per mol. Agglutinants based on diene polymers comprising a substantial molar amount of hydroxyl reactive groups presently are preferred since certain of these polymers are potentially relatively inexpensive and readily available, and therefore make possible additional reductions in the cost of manufacturing cured agglutinated products according to this invention.

The agglutinant of this invention is particularly adapted for use as an adhesive to be applied in the form of a continuous layer on one surface of a suitable backing sheet and cured in situ thereon. The adhesive layer may be normally tacky and pressure-sensitive or normally non-tacky and heat sensitive, depending upon the formulation applied. One of the important advantages of this invention is that the adhesive is coated on the backing while the diene polymer still is in a liquid state and with the other constituents of the adhesive or agglutinant composition dispersed in the liquid polymer. Normally, only enough solvent is included in the composition to disperse the heat curing constituents of the agglutinant in the liquid polymer. Ideally, no solvent is needed when the heat curing constituents, themselves, are liquid. This means that the adhesive mixture may be coated on the backing and cured as rapidly as possible without the need for drying the coated sheet for removing the solvent. If a solvent is used, the coated sheet preferably is first dried at a relatively low temperature, say at 250° F. for five to ten seconds to remove the solvent, and then cured. Thus, this invention makes it possible to remove the solvent almost instantaneously and then cure the adhesive in situ very rapidly, i.e., in four minutes or preferably less time, at an elevated temperature in the neighborhood of 350° F., without the formation of blow holes due to the rapid removal of an excess of solvent. Preferably, for this purpose, no more than about 30 percent by weight of the agglutinant composition of a solvent for the heat curing constituents is used. Of course, it is necessary that any solvent used for the heat curing constituents be compatible with the diene polymer so that the heat curing constituents and solvent may be uniformly dispersed or dissolved in the polymer. Conventional solvents such as toluene or xylene normally are suitable for this purpose. In production, drying and curing may occur in one oven which has at least two chambers, one short one at the drying temperature and a such longer one at the curing temperature. Since the sheet passes through both chambers at the same speed, relative drying and curing times can only be established by the lengths of the chambers devoted to each purpose. Typically, the oven may have six chambers of equal length and the first chamber may be used for drying while the last five are used for curing. In order to minimize the treatments time and increase the speed of production, it may also be desirable to maintain the last two or three chambers at temperatures substantially over 350° F. if the materials employed would not be adversely affected by their exposure to such a temperature. An increase to 380° F., for example, may decrease the affected portion of the curing cycle to one-half or one-third of its former time.

Similarly, the liquid polymer based agglutinant of this invention is ideal for use as an impregnant or unifying material for a fibrous sheet or web. Agglutinant compositions with a low percentage of solvent make it possible to more uniformly and thoroughly distribute the agglutinant throughout the interstices of the web and into intimate and continuing contact with the fibers to be bonded. In which case, the solvent may be removed from the web from the side through which it is applied without interfering with or delaying the curing step or disrupting the continuity of the bonded structure. Furthermore, the agglutinant of this invention may be used as the base for an impregnant comprising a substantially higher amount of solvent, i.e., in the range of conventional solvent based impregnants, with superior results due to the fast cures attainable and the excellent bonding achieved with certain relatively inexpensive liquid diene polymer based agglutinants within the purview of this invention.

Generally speaking, the agglutinant comprises about 20–150 parts by weight per hundred parts of the liquid polymer (p.p.h.l.p.) of the aldehyde curing resin, and about 0–150 (p.p.h.l.p.) of the compatible accelerator for the curing resin. Whenever the term "parts" is used hereinafter, it shall mean parts by weight per hundred parts of the liquid polymer (p.p.h.l.p.), unless otherwise specified. The necessary amounts of the aldehyde curing resin and the accelerator therefor will vary with the area of use to which the agglutinant is put and with the aldehyde resin used. or instance, at least 0.5 part of the compatible accelerator is deemed necessary when a phenol formaldehyde curing resin is used, whereas no accelerator is needed with certain urea formaldehyde or melamine formaldehyde curing resins. The following are examples of preferred ranges for the aldehyde curing resin and the accelerator therefor. First of all, when the agglutinant is used as a pressure-sensitive adhesive, some tackifier normally is present. However, for low tack applications, the agglutinant itself may be sufficiently sticky without the addition of a tackifier. The preferred range governing the presence of tackifying material or resin in a pressure-sensitive adhesive according to this invention is 0–100 parts. Generally speaking, for pressure-sensitive adhesive applications, the agglutinant comprises 20–60 parts of the heat curing resin and about 0–40 parts of a compatible accelerator therefor; normally about 0.5–40 parts accelerator when the phenol aldehyde resin is used. However, the exact amount of accelerator needed depends upon the type of accelerator used. For instance, in pressure-sensitive adhesives based on phenol aldehyde resins, the following accelerators may be used in the preferred ranges indicated, i.e., zinc resinate, 15–50 parts; zinc oxide, 5–50 parts; para-toluene sulfonic acid and 0.05–5 parts for the acid accelerators, or stannous chloride. When the agglutinant is to be used as an impregnant or unifying material for fibrous webs or as a normally non-tacky but heat-sensitive adhesive, the agglutinant may comprise about 20–150 parts of the curing resin and about 0–150 parts accelerator or about 0.5–150 parts accelerator for a phenol aldehyde curing resin. Again, the amount of accelerator used in these applications will depend more specifically upon the type accelerator. The following are the preferred ranges for the accelerators indicated when the agglutinant is based on a phenol aldehyde resin and used as a fiber bonding agent or a normally non-tacky but heat-sensitive adhesive, i.e., zinc resinate, 15–150 parts; zinc oxide, 5–100 parts; para-toluene sulfonic acid, 0.5–5 parts; and stannous chloride, 0.5–5 parts.

As indicated hereinbefore, the normally liquid synthetic diene polymers of this invention are those which have a molecular weight of between about 500 and 4,000 and comprise a substantial molar percentage of hydroxyl or carboxyl reactive groups in the sense that this term has been defined herein. When the term diene polymer or polymers is used in this application, it shall mean conjugated diene polymers based on butadiene, isoprene, or the like; copolymers of these materials with one another; and copolymers of one or more of such materials with one or more other monomers such as acrylonitrile, styrene, or the like. Among the hydroxyl modified polymers which are useful in accordance with this invention are Poly B–D R15M, a butadiene polymer; Poly B–D CS–15, a butadiene-styrene polymer comprising approximately 75 percent butadiene and 25 percent styrene; and Poly B–C CN–15, a butadiene-acrylonitrile polymer comprising approximately 85 percent butadiene and 15 percent acrylonitrile. Each of the above polymers comprises approximately two to two and one-half hydroxyl reactive groups per mol. A typical carboxyl modified diene polymer according to this invention is Butarez CTL, a butadiene polymer and comprising approximately two carboxyl reactive groups per mol. A liquid diene polymer of this invention comprising both hydroxyl and carboxyl reactive groups is Poly B–D A35, a butadiene-styrene based polymer having a combined total of one reactive group per mol which in turn comprises in the order of one-half of a hydroxyl group and one-half of a carboxyl group. Various other normally liquid synthetic diene polymers within the described range of molecular weight and comprising the specified molar percentage of hydroxyl and/or carboxyl reactive groups may be used in formulating the agglutinant of this invention.

The oil soluble diene-polymer-reactive heat curing formaldehyde resins of this invention include phenol formaldehyde resins such as Amberol ST 137, an octyl phenol formaldehyde resin; nonyl phenol formaldehyde resins such as Resin B described in Examples I and II of United States Letters Patent No. 2,987,420; SP–1055 and 1056 Resins, bromo-methyl alkylated phenol formaldehyde resins; and the like. Certain oil soluble diene-polymer-reactive heat curing urea and melamine formaldehyde resins of this invention such as Uformite F 226E, a urea formaldehyde resin; and Resinene 875, a melamine formaldehyde resin; cure so effectively that they may be used in accordance with this invention without employing an accelerator for the cure. The high reactivity of these urea and melamine formaldehyde resins may be particularly advantageous for coating heat sensitive backings. Under these circumstances, continous mixing or coating just after mixing may be required.

Liquid or solid tackifiers for pressure-sensitive adhesives may be used to render the agglutinant of this invention normally tacky and pressure-sensitive. These include Gorite 275 Ester, a diethylene glycol ester of dehydroabietic acid in toluene; Circolyte Oil, a fluid napthenic type oil; Terpex Extra, a terpene hydrocarbon resin having a melting point of −10° C.; Stickvel P, a polymeric elastic solid tackifier; and others.

Various films, foils, papers and other sheet materials may be used for the backing sheet in forming pressure-sensitive adhesive tapes and other adhesive sheet materials according to this invention. However, since the agglutinant is cured in situ thereon, the backing must be suitable for exposure to the curing conditions without serious deterioration. Materials such as foils of aluminum and other metals, films of polyesters such as polyethylene terephthalate, and similar materials may be used when the agglutinant is to be cured at approximately 350° F. Obviously, the suitability of other materials for this purpose depends upon the curing temperature employed and the time which the backing is exposed thereto.

The agglutinant of this invention may be used with advantage for many purposes. As indicated hereinbefore, it is particularly useful for pressure-sensitive adhesives, for normally non-tacky but heat-sensitive adhesives, as a bonding material for unifying fibrous webs and the like. In all of these uses, this invention makes it possible to mix the adhesive or unifying material from liquid constituents without the need for complex mixing equipment or techniques, and then coat or impregnate the liquid composition directly onto a backing sheet or into a fibrous web in a continuous mixing and coating process. Very little, if any, solvent is required for this purpose with the result that loss of solvent is extremely low and blowing problems caused by rapid removal of solvent are eliminated or minimized. All ingredients may be continuously metered and pumped into a mixing chamber and the liquid materials are easily mixed into a homogeneous mass which may be coated immediately or stored for subsequent use with excellent shelf life.

In addition to the general applications already mentioned, the agglutinant of this invention may be used as a thermosetting heat sealing adhesive, as an adhesive for bonding a flocking coating, as the base adhesive for a bonding layer for abrasive particles in sandpaper, as a primer layer for latex impregnated paper-backed tape, as a thread saturating coat for reinforced tapes, as a combined fiber bonding impregnant and low tack pressure-sensitive adhesive layer, and for many other specific purposes.

Other and further advantages of this invention will be apparent from the following description, examples and claims taken together with the drawings wherein:

FIG. 1 is a view in perspective of a roll of pressure-sensitive adhesive tape wherein the adhesive tape wherein the adhesive is an agglutinant according to one embodiment of this invention.

FIG. 2 is a greatly enlarged schematic sectional view of the adhesive tape of FIG. 1.

FIG. 3 is a similarly enlarged schematic view in elevation of a fibrous web unified with an agglutinant according to this invention.

FIG. 4 is a similarly enlarged schematic view in elevation of the unified fibrous web of FIG. 3 showing an adhesive layer coated on one surface thereof.

FIG. 5 is a similarly enlarged schematic view in elevation of a sandpaper wherein the agglutinant of this invention acts both as the fiber bonding material for the backing and as the bonding layer for the abrasive particles.

Referring to FIGURES 1 and 2 of the drawings, there is shown a pressure-sensitive adhesive tape 10 according to one embodiment of the invention which comprises a backing film 11 of a material such as polyethylene terephthalate and a normally tacky and pressure-sensitive adhesive layer 12 applied to one surface of the backing. The resulting tape 10 normally is wound upon itself in roll form with the adhesive side of the tape facing the axis of the roll as shown in FIG. 1, and is adapted to be unwound from the roll without offsetting of the adhesive on the opposite surface of the backing 11. A suitable release or backsize coating, not shown, may be applied to the other surface thereof to facilitate unwinding of the tape, and in some circumstances, a primer layer, also not shown, may be applied between the backing 11 and the adhesive layer 12 to assure maximum attachment between the adhesive and the backing.

FIGURE 3 illustrates a unified fibrous web 13 according to still a different embodiment of the invention which comprises a web or paper layer of overlapping, interlacing fibers 14 forming a multipilicity of interstices in between themselves and a bonding material 15 in the form of an agglutinant according to this invention substantially uniformly dispersed throughout the fibrous layer and in bonding relation with the fibers 14 thereof. The agglutinant 15 in this case normally is cured to the point where it is substantially non-tacky although it remains elastomeric and relatively soft to provide a flexible and extensible unified paper wab 13.

FIGURE 4 illustrates a modification of the product shown in FIG. 3 wherein a normally tacky and pressure-sensitive agglutinant of this invention is applied to one surface of the unified paper to form a pressure-sensitive adhesive layer 16 and provide a paper-backed pressure-sensitive adhesive tape 17 according to this invention.

FIGURE 5 illustrates a different embodiment wherein an abrasive paper 18 is formed by applying a normally non-tacky agglutinant of this invention to one surface of a unified paper web 19 similar to that of FIG. 3, to form a bonding coat 20 for abrasive particles 21. The abrasive particles 21 are coated on the outer surface of the bonding coat 20 in such a way that they penetrate the bonding agglutinant and the agglutinant is cured in situ to fix the particles in position, thereby providing a paper-backed abrasive paper which is flexible and strong.

The agglutinant of this invention may be used in various other ways to form products similar to those shown in the drawings. For instance, a normally non-tacky and heat-sensitive agglutinant layer of this invention may be applied to the backing of FIG. 1 or FIG. 4 to provide a heat-sensitive adhesive sheet or tape. In which case, the adhesive, though normally non-tacky, may be activated by heat to bond the sheet to another surface. In this case, the same agglutinant may be used in the embodiment of FIG. 4 both to unify the fibers of the backing and to form the heat-sensitive adhesive layer on one surface of the backing. Various intermediate bonding coats, or primers, and backsize coats or release layers may be employed in forming coated products according to this invention to suit the needs of the particular application and the materials used.

The invention will be further illustrated in greater detail by the following examples. It should be understood that although these examples may describe some of the more specific features of the invention, they are given only for the purpose of illustration and the invention should not be construed as limited thereto. Unless otherwise indicated, all parts given are parts by weight per hundred parts of the normally liquid synthetic diene polymer (p.p.h.l.p.), as stated hereinbefore.

Example I

A series of agglutinant compositions of this invention are formed by mixing each of the normally liquid synthetic diene polymers listed in Table A, below, with heat curing constituents consisting of 36 parts of Amberol ST 137, an octyl phenol formaldehyde resin made from the alkaline condensation of para tertiary octyl phenol and formaldehyde, and having a melting point of about 87° C.; and 20 parts of zinc resinate (Zirex); along with 22 percent by weight of the composition of toluene (a compatible solvent for the heat curing constituents); except that in the case of Polymer B, 35.8 percent toluene by weight of the composition is used. In each case, the materials are thoroughly mixed until the heat curing constituents are substantially uniformly mixed in the liquid of the elastomer.

TABLE A

| Liquid Polymer | Material and Manufacture | Number Average Molecular Weight | Approximate No. of Reactive Groups per mol |
|---|---|---|---|
| Polymer: | | | |
| A | (Polybutadiene polymer Poly B-D R 15 M). | 3,421 | 2-2½ hydroxyl. |
| B | Butadienestyrene polymer (Poly B-D A 35). | 973 | 1 group comprising about ½ hydroxyl and ½ carboxyl. |
| C | Butadienestyrene polymer (Poly B-D CS-15). | 2,902 | 2-2½ hydroxyl. |
| D | Butadiene-acrylonitrile polymer (Poly B-D CN-15). | 2,644 | Do. |
| E | Polybutadiene polymer (Butarez CTL). | 3,611 | 2 carboxyl. |

The resulting agglutinants are suitable for use as a bonding material for unifying a fibrous web, as a primer to be applied to a backing film to facilitate the bonding of an adhesive mass thereto, or as a low tack pressure-sensitive adhesive, or (with the addition of a conventional tackifer) as a typical pressure-sensitive adhesive to be coated on a backing to form a pressure-sensitive adhesive tape; and are adapted to be cured in situ after the application in the desired structure well within four minutes at a temperature of no more than 350° F. For example, these agglutinants each are applied to 28 pound per ream semi-bleached creped saturating grade kraft papers utilizing a standard coating machine having a one-half inch round knife to thoroughly distribute the agglutinant throughout the interstices of the webs and into intimate contact with the fibers thereof. Then the resulting impregnated webs are subjected to a temperature of 350° F. to drive off the solvent and cure the agglutinant in intimate bonding contact with the fibers of the web. The times required to cure the agglutinants to the desired relatively soft elastomeric state in bonding relation with the fibers is given below for each of the aforesaid polymer mixtures.

| Agglutinant | Polymer | Curing Time, Minutes |
|---|---|---|
| 1 | A | 3.0 |
| 2 | B | 0.8 |
| 3 | C | 2.5 |
| 4 | D | 3.5 |
| 5 | E | 3.0 |

Example II

A group of four different agglutinants are made from Polymer A of Example I, mixing the octyl phenol formaldehyde resin and the zinc resinate of the foregoing example in the following proportions to give cures in the times indicated when the agglutinants are used as impregnants and subjected to a curing temperature of 350° F. as described in Example I at the toluene (solvent) levels given below.

| Agglutinant | Parts Formaldehyde Resin | Parts Zinc Resinate | Percent Toluene by weight Composition | Time, Curing Minutes |
|---|---|---|---|---|
| 6 | 36 | 50 | 28.5 | 2.0 |
| 7 | 60 | 35 | 27.8 | 2.5 |
| 8 | 120 | 20 | 50.0 | 1.8 |
| 9 | 36 | 100 | 50.0 | 1.8 |

In each case, the agglutinant cures rapidly in substantially less than four minutes.

Agglutinant 8 with its relatively high percentage of formaldehyde resin and agglutinant 9 with its relatively high percentage of zinc resinate both tend to cure beyond the point at which they would be suitable for use as a presure-sensitive adhesive (even with the addition of tackifier). Also, while agglutinants 8 and 9 may be used satisfactorily as an impregnant for bonding fibrous webs, the relatively high amount of solvent they contain renders them less suitable as an adhesive for coating applications.

Example III

Additional agglutinant compositions of this invention are prepared from Polymer A as generally described in Example I using the following five oil soluble diene-polymer-reactive heat curing aldehyde resins in the proportions indicated, applied to a fibrous web and cured at 350° F. as described in the foregoing examples with the following results:

| Agglutinant | Formaldehyde Resin | Parts Formaldehyde Resin | Parts Zinc Resinate | Percent Solvent by wt. Composition | Curing Time, Minutes |
|---|---|---|---|---|---|
| 10 | Ethyl Resin 78 | 36 | 20 | [1] 22 | 4.0 |
| 11 | Nonylphenol formaldehyde resin | 40 | 20 | [1] 22.3 | 1.5 |
| 12 | SP-1055 Resin | 40 | | [1] 22.2 | 3.0 |
| 13 | Uformite F 226E | 10 | | [2] 8.3 | 3.0 |
| 14 | Resimene 875 | 30 | | [3] 18.7 | 0.5 |

[1] Toluene.
[2] Capryl alcohol and butanol.
[3] Butanol and xylol.

Ethyl Resin 78 is a heat reactive phenol formaldehyde resin prepared from ortho-tertiary-butylphenol with a softening point of 120° C. (determined by the ball and ring method).

The nonyl phenol formaldehyde resin is made in a 1 liter flask equipped with a reflux condenser and decanter. 220.0 g. of nonyl phenol (1 mol) is charged into the flask. 49.5 parts of a 91 percent paraformaldehyde (1.5 mols) is added and 11.0 parts of a 20 percent NaOH solution (0.55 mol) is finally added. The mix is heated and stirred at 90° for 2 hours. Then 126.3 g. toluene is added and the solution is azeotroped for approximately 2 hours. The final solution viscosity is J on the Gardner-Holdt scale (25° C.). This resin has a softening range of 46–82° C. as measured on the Kofler Heizbank melting point apparatus.

SP–1055 Resin is a heat-reactive, bromo-methyl alkylated, phenol-formaldehyde resin having a specific gravity of 1.05 and a melting point of 135° F. (Capillary Tube Method). No additional accelerator is used with this resin since it contains its own accelerator. It is believed that hydrogen bromide is formed when the agglutinant is mixed and heated and that this material acts as an acid accelerator in the curing of the agglutinant.

Uformite F 226E is a urea formaldehyde resin dissolved at 50 percent solids in a mixture of capryl alcohol and butanol and having a specific gravity of 0.98 and a Gardner-Holdt viscosity of W–Z.

Resimene 875 is a melamine formaldehyde resin dissolved at 50 percent solids in a 1:1 mixture of butanol and xylol and having a specific gravity of 0.991–1.002 and a Gardner-Holdt viscosity of L–P.

Example V

Various fillers may be added to the agglutinant of this invention, either to provide body or color thereto, or to help stabilize the system, without detracting from the fast cure obtained. For instance, the following fillers are mixed thoroughly with the ingredients of agglutinant 1 of Example I with the following results:

| Agglutinant | Filler | Parts Filler | Percent Toluene by wt. Composition | Curing Time, Minutes |
|---|---|---|---|---|
| 19 | Zinc chlorice | 25 | 19.6 | 2.5 |
| 20 | do | 50 | 17.6 | 2.5 |
| 21 | Clay (ASP 200) | 25 | 19.6 | 3.0 |
| 22 | Titanium dioxide | 3 | 50 | 2.0 |

Agglutinants 19, 20 and 21 are particularly adapted to be used to formulate pressure-sensitive adhesives after the addition of suitable tackifiers therefor, whereas agglutinant 22 with its higher toluene content may be used directly as an impregnant for unifying a fibrous web. In each case, the agglutinants are cured in situ after application to the backing or web, as the case may be.

Example VI

In this example, various tackifiers are added in the proportions indicated to agglutinant 1 of Example I to provide pressure-sensitive adhesives which are cured in situ at the times indicated after being coated by conventional techniques on one surface of one and one-half mil polyethylene terephthalate film when subjected to a curing temperature of 350° F. at the toluene levels set forth. One of these agglutinants includes a filler, as indicated.

| Agglutinant | Tackifier | Parts Tackifier | Parts Zinc Oxide Filler | Percent Toluene by wt. Composition | Curing Time, Minutes |
|---|---|---|---|---|---|
| 23 | Diethylene Glycol Ester of Dehydroabietic acid (in toluene) sold as Gorite 275 Ester. | 24 | | 18.4 | 3.0 |
| 24 | Diethylene Glycol Ester of Dehydroabietic acid (in toluene) sold as Gorite 275 Ester. plus Fluid napthenic type oil sold as Circolyte Oil | 16 30 | | 19.2 | 3.3 |
| 25 | Terpene hydrocarbon resin having a melting point of −10° C. and sold as Terpex Extra. | 50 | | 17.6 | 3.0 |
| 26 | Polymeric elastic solid tackifier sold as Stickvel P | 35 | | 23.6 | 3.3 |
| 27 | do | 35 | 25 | 21.5 | 3.3 |

Example IV

Four additional agglutinant compositions of this invention are prepared from Polymer A using 24 parts of the octyl phenol formaldehyde resin of Example I and the following acid accelerators therefor to give cures as indicated below when the agglutinants are roller coated on a one and one-half mil polyethylene terephthalate film and subjected to a curing temperature of 350° F. as described in Example I at the toluene (solvent) levels set forth.

| Agglutinant | Accelerator | Parts Accelerator | Percent Toluene by wt. Composition | Curing Time, Minutes |
|---|---|---|---|---|
| 15 | Toluene sulfonic acid in 50% islpropyl acohol. | .5 | 15.7 | 2.0 |
| 16 | do | 1.0 | 19.4 | .3 |
| 17 | Stannous chloride | 2 | 17.3 | .3 |
| 18 | do | 1 | 17.3 | .3 |

The extremely rapid curing rate of these agglutinants makes them particularly advantageous for use when they can be coated and cured directly after mixing the accelerator with the heat-curing resin. When a conventional tackifier for pressure-sensitive adhesives is added to the agglutinant prior to coating and curing on the polyethylene terephthalate film, the resulting coated sheet is ideal for use as a pressure-sensitive adhesive tape.

The Stickvel P polymeric elastic solid tackifier is believed to be the Friedel-Crafts polymerization product of still residue from commercial oil distillation high in indene and isoprene to which has been added butadiene and styrene and having a molecular weight within the range of about 500 to 2000, a melting point of about 125° F.–135° F. and an acid number of less than 1.

The resulting coated film may be slit and wound upon itself to form rolls of pressure-sensitive adhesive tape, or the opposite side of the film may first be coated with a suitable backsize or release layer prior to slitting and winding the tape in the form of a roll.

Example VII

In this example, a paper-backed pressure-sensitive adhesive tape is produced utilizing standard commercial techniques. The backing is a 27 pound per ream basis weight flat kraft-type paper impregnated with 50 percent by weight of the fibers of an acrylic latex unifying material. This backing is first coated with a release coating composition made as described in United States Letters Patent No. 2,913,355. The release layer is knife coated onto the backing at a dry coating weight of 0.25 oz. per square yard. dried and cured in situ thereon. Then, an agglutinant the same as agglutinant 27 of Example VI is coated onto the other side of the backing by a standard commercial method at a dry coating weight of 1.2 oz.

per square yard, dried and cured as aforesaid. The coated backing is then dried and cured by passing it through a three-chamber oven wherein it is successively subjected to temperatures of 275° F. for 8.4 seconds, 350° F. for 16.8 seconds, and 380° F. for 25.2 seconds. The resulting cured pressure-sensitive adhesive sheet is slit by standard techniques into tapes one inch in width and wound upon paper cores. Typical physical properties of the finished pressure-sensitive adhesive tape product are:

| | |
|---|---|
| Tensile strength, lbs./in. width | 33 |
| Percent elongation, percent | 3.5 |
| Adhesion to steel, oz./in. width | 24 |
| Unwind adhesion, oz./in. width | 29 |

The resulting pressure-sensitive adhesive tape has excellent quickstick, yet may be unwound easily from the tape roll without offsetting of the adhesive.

Example VIII

A unified paper sheet of this invention is formed by impregnating a 28½ lb. per ream semi-bleached creped saturating grade paper with an agglutinant similar to agglutinant 1 of Example I with the exception that it contains one (p.p.h.l.p.) of titanium dioxide and the toluene content is 50 percent by weight of the agglutinant composition. The impregnant is applied to the paper backing by a standard commercial knife coating machine until the backing is saturated. Then, the impregnated backing is dried and cured by passing it through three chambers of a heated oven wherein it is successively subjected to temperatures of 250° F. for 4.2 seconds, 350° F. for 8.4 seconds, and 390° F. for 12.6 seconds. The impregnated and cured backing is then backsized with the release composition of Example VII under the conditions described in that example. Typical physical characteristics of the impregnated and backsized backing are:

| | |
|---|---|
| Percent impregnation (percent dry weight by weight of fibers) | 43 |
| Delamination resistance, oz./in. of width | 41 |
| Tear strength, lbs./in. of width | 2 |
| Tensile strength, lbs./in. | 19.5 |
| Percent elongation, percent | 12.5 |
| Dielectric strength, volt | 1208 |

A conventional pressure-sensitive adhesive having the following composition is then applied to the non-backsized surface of the backing at a coating weight of 1.9 oz. per square yard.

| Constituent: | Parts |
|---|---|
| Pale crepe rubber | 100 |
| Polyterpene resin (melting point 115° C.) | 70 |
| Zinc oxide | 25 |
| Tertiary amyl hydroquinone | 1 |
| Toluene | 85 |

The adhesive then is dried in situ at about 190–250° F. The finished product is slit down to tapes of one inch width and wound upon paper cores. The resulting pressure-sensitive adhesive tape has excellent tack and release properties, with an adhesion to steel of 30 oz. per inch of width.

Example IX

A heat sensitive metal foil tape according to this invention is formed by coating an agglutinant having the following composition onto one surface of a dead soft aluminum alloy sheet approximately 5 mils thick.

| Constituent: | Parts |
|---|---|
| Polymer A | 100 |
| Formaldehyde resin | 60 |
| Zirex | 50 |

This agglutinant contains approximately 30 percent toluene and the formaldehyde resin is that described in Example I. The coated foil is dried and cured to a nontacky state by subjecting it to a temperature of about 350° F. for two minutes to apply a dry adhesive layer weighing approximately one ounce per square yard.

The resulting adhesive coated aluminum sheet is slit into one-half inch widths and used to seal top opening aluminum cans. The tape is bonded to the can by pressing its adhesive side against the portion to be closed or sealed and then subjecting the resulting laminate to temperatures of between 275 and 300° F. for 30 seconds under 80 lbs. per square inch pressure. This results in an excellent bond between the tape and the can, but allows the tape to be stripped by hand from the can to allow the can to be opened.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. An agglutinant composition heat curable within about four minutes at no more than 350° F. to a relatively soft elastomeric state, which comprises a normally liquid synthetic polymer or copolymer of butadiene or isoprene having a molecular weight of between about 500 and 4,000 and an average of about one-half to two and one-half hydroxyl or carboxyl reactive groups per mol; and heat curing constituents substantially uniformly dispersed in the liquid polymer, said heat curing constituents comprising about 20–150 parts by weight of the polymer of an oil soluble diene-polymer-reactive heat-curing phenol formaldehyde, urea formaldehyde, or melamine formaldehyde resin.

2. A liquid agglutinant according to claim 1, wherein said resin is a phenol formaldehyde resin and said heat curing constituents also comprise about 0.5–150 parts by weight of the polymer of a compatible acelerator selected from the group consisting of zinc resinate, zinc oxide, para-toluene sulfonic acid and stannous chloride.

3. A liquid agglutinant according to claim 2, wherein the accelerator is zinc resinate present in an amount by weight of the polymer of about 15–150 parts.

4. A liquid agglutinant according to claim 2, wherein the accelerator is zinc oxide present in an amount by weight of the polymer of about 5–100 parts.

5. A liquid agglutinant according to claim 2, wherein the accelerator is para-toluene sulfonic acid or stannous chloride and is present in an amount by weight of the polymer of about 0.5–5 parts.

6. A liquid agglutinant according to claim 1, curable to a normally tacky pressure-sensitive state under the aforesaid conditions, wherein said heat curing resin is present in the amount of about 20–60 parts by weight of the polymer and which further comprises no more than about 100 parts by weight of the polymer of a tackifier for said adhesive coating composition.

7. A liquid agglutinant according to claim 6, wherein said resin is a phenol formaldehyde resin and said heat-curing constituents also comprise about 0.5–150 parts by weight of the polymer of a compatible acelerator selected from the group consisting of zinc resinate, zinc oxide, para-toluene sulfonic acid and stannous chloride.

8. A liquid agglutinant according to claim 7, wherein the accelerator is zinc resinate present in an amount by weight of the polymer of about 15–50 parts.

9. A liquid agglutinant according to claim 7, wherein the accelerator is zinc oxide present in an amount by weight of the polymer of about 5–50 parts.

10. A liquid agglutinant according to claim 7, wherein the acelerator is para-toluene sulfonic acid or stannous chloride and is present in an amount by weight of the polymer of about 0.5–5 parts.

11. A liquid agglutinant according to claim 1, wherein no carboxyl reactive groups are present and said diene polymer comprises about two to two and one-half hydroxyl reactive groups per mol of said polymer.

12. An adhesive coated sheet which comprises a backing sheet, and a relatively soft and elastomeric continuous adhesive layer coated on one surface of said backing sheet, said adhesive layer being heat-cured in situ on said sheet within about four minutes at a temperature of no more than about 350° F. from an adhesive coating composition comprising a normally liquid synthetic polymer or copolymer of butadiene or isoprene having a molecular weight of between about 500 and 4,000 and an average of about one-half to two and one-half hydroxyl or carboxyl reactive groups per mol, and heat curing constituents comprising about 20–150 parts by weight of the polymer of an oil soluble diene-polymer-reactive heat-curing phenol formaldehyde, urea formaldehyde, or melamine formaldehyde resin.

13. An adhesive coated sheet according to claim 12, wherein said adhesive composition comprises no more than 30 percent by weight of the composition of a compatible solvent for said heat curing constituents.

14. An adhesive coated sheet according to claim 3, wherein said adhesive coating composition comprises about 20–60 parts by weight of the polymer of the diene-polymer-reactive heat-curing aldehyde resin, and which further comprise no more than about 100 parts by weight of the polymer of a tackifier for the adhesive coating composition, and said adhesive coating composition is cured to a normally tacky pressure-sensitive state.

15. A unified fibrous sheet which comprises a bibulous fibrous layer and an elastomeric unifying material substantially uniformly dispersed throughout said fibrous layer in bonding relation with the fibers thereof, said unifying material being heat-cured in situ in said sheet within about four minutes at a temperature of no more than about 350° F. from a unifying composition comprising a normally liquid synthetic polymer or copolymer of butadiene or isoprene having a molecular weight of between about 500 and 4,000 and an average of about one-half to two and one-half hydroxyl or carboxyl reactive groups per mol, and heat curing constituents comprising about 20–150 parts by weight of the polymer of an oil soluble diene-polymer-reactive heat-curing phenol formaldehyde, urea formaldehyde, or melamine formaldehyde resin.

References Cited

UNITED STATES PATENTS 3,100,160   8/1963   Korpman ----------- 260—27

OTHER REFERENCES

Skeist, I.: "Handbook of Adhesive" Reinhold Publishing Co. 1962, TP 968 S5 C.2 (pp. 255–266 relied on).

"Hycar Latex Manual," B. F. Goodrich Co. 1956, Cleveland, TS 1925 G6HL C.2 (pp. 39 relied on).

"Hycar Rubber & Latex," B. F. Goodrich Co. 1960, TS 1925 G6hy C.2.

DONALD E. CZAJA, Primary Examiner

WILLIAM E. PARKER, Assistant Examiner

U.S. Cl. X.R.

117—68, 76, 122, 155; 260—27, 845, 846, 852

UNITED STATES PATENT OFFICE
CERTIFICATE OF CORRECTION

Patent No. 3,455,859                                                    July 15, 1969

Ralf Korpman

It is certified that error appears in the above identified patent and that said Letters Patent are hereby corrected as shown below:

Column 2, line 15, "ploymer" should read -- polymer --; line 68, "are present in the polymer. When no car-" should read -- necessary to give a fast cure, i.e., within --. Column 3, line 5, "the", second occurrence, should read -- no --; line 51, "such" should read -- much --. Column 4, line 19, "or" should read -- for --. Column 6, line 6, "impergnated" should read -- impregnated --; line 15, cancel "wherein the adhesive tape"; line 59, "wab" should read -- web --; line 66, after "embodiment" insert -- of this invention --; line 75, "adbrasive" should read -- abrasive --. Column 7, line 51, Table A, the parenthesis before the word "polybutadiene" should be cancelled, and a parenthesis should be inserted before "Poly B-D". Column 12, lines 36 and 58, "acelerator", each occurrence, should read -- accelerator --. Column 13, line 20, claim reference numeral "3" should read -- 13 --.

Signed and sealed this 28th day of April 1970.

(SEAL)
Attest:

EDWARD M. FLETCHER, JR.                            WILLIAM E. SCHUYLER, JR.
Attesting Officer                                          Commissioner of Patents